UNITED STATES PATENT OFFICE 2,212,900

PROCESS AND PRODUCT RELATING TO THE OXIDATION OF UNSATURATED ALDEHYDES

Herbert P. A. Groll and George Hearne, Berkeley, Calif., assignors to Shell Development Company, San Francisco, Calif., a corporation of Delaware No Drawing. Application September 11, 1935, Serial No. 40,069

5 Claims. (Cl. 260—530)

This invention relates to the oxidation of readily polymerizable unsaturated aldehydes to the corresponding unsaturated carboxylic acids and to the esterification of said unsaturated acids, and it further relates to the method of stabilizing unsaturated acids against excessive polymerization and to the resulting stabilized products.

An object of the invention is to provide a practical and economical process for oxidation of members of a class of unsaturated aldehydes which, due to their structural characteristics, are so readily polymerizable, and yield unsaturated acids which have such a great tendency to polymerize, that the known methods of oxidation of aldehydes are ineffective in producing practical yields of the corresponding commercially valuable unsaturated carboxylic acids.

Among the unsaturated aldehydes which may be oxidized to the corresponding valuable unsaturated acids in accordance with the invention are those unsaturated aldehydes which possess an unsaturated tertiary carbon atom linked by a double bond to a methene radical and by single bonds to a carbon atom of an organic radical and to an aldehyde group. Isobutenal

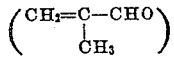

and its homologues are representatives of this preferred group of compounds. These compounds may be represented by the general formula $$CH_2=C^{III}-CHO$$
<br>R wherein the $C^{III}$ carbon atom is tertiary, that is, linked to three other carbon atoms, and R represents an organic radical which is linked to the $C^{III}$ carbon atom by a carbon atom and which may or may not have one or more of its hydrogen atoms substituted by suitable inorganic or organic substituents. For example, R may be an alkyl radical as methyl, ethyl, propyl, isopropyl, butyl, isobutyl, tertiary butyl, amyl, tertiary amyl and the like and their homologues, analogues and suitable substitution products. R may represent an aralkyl or aryl radical as phenyl, benzyl, naphthyl, xylyl and the like; an alicyclic radical as cyclopropyl, cyclobutyl, cyclopentyl, cyclohexyl and the like; or a suitable heterocyclic radical. R may be an unsaturated radical as ethenyl, propenyl, butenyl, ethinyl, propargyl, styryl and the like and their homologues, analogues and suitable substitution products. As examples of suitable substituted radicals, R may represent radicals as

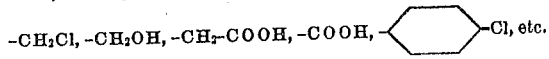

Due to the particular active structure of the members of the class of unsaturated aldehydes herein described, these compounds cannot be successfully oxidized to their corresponding unsaturated carboxylic acids by the known methods. Under the conditions of oxidation necessitated by the known methods, the unsaturated aldehydes as well as the resulting oxidation products are rapidly and substantially completely polymerized to insoluble and useless products. The unsaturated acid of the formula

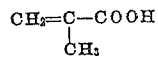

resulting from the oxidation of isobutenal

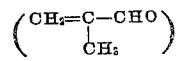

when present in a concentrated form as would be obtained by the prior art methods, polymerizes with explosive violence. This behavior is quite different from that of unsaturated acids not possessing this characteristic active structure, since the latter as well as the corresponding unsaturated aldehydes polymerize much more slowly. We have found that, in the aldehydes possessing the structure

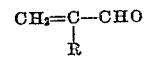

the replacement of either or both of the hydrogen atoms in the $CH_2$ group by an organic radical, or replacement of R by a hydrogen atom materially decreases the tendency of the aldehydes as well as the corresponding acids to polymerize.

Now, we have found that, in accordance with our invention, the unsaturated aldehydes of the type herein described may be readily and economically oxidized and the corresponding unsaturated carboxylic acids obtained in excellent yields.

The process is preferably executed by adding to the unsaturated aldehyde or mixture of aldehydes to be treated a sufficient amount of a relatively inert substance which serves as a diluent for said aldehyde or aldehydes, and bringing said, preferably homogeneous, mixture into reaction with an oxidizing agent, preferably molecular oxygen, at a temperature and for a time sufficient to effect oxidation of the unsaturated aldehyde to the corresponding unsaturated carboxylic acid at a practical rate. By control of the dilution of the aldehyde or aldehydes, the temperature of reaction and other conditions as contact time, substantially complete reaction may be effected while substantial polymerization is obviated.

The most effective dilution of the unsaturated aldehyde in the reaction mixture appears to be below about 75% by weight of the reaction mixture. We may treat reaction mixtures containing relatively less of the diluent material, but, in general, the unsaturated aldehydes as well as the unsaturated acids have a greater tendency to polymerize when present in concentrations higher than about 75%. In the majority of cases, the invention may be successfully executed with the unsaturated aldehyde initially present in the reaction mixture in a concentration of from about 40% to about 75%. Further dilution, while it may be more effective in preventing polymerization, becomes less and less economical due to the increasing bulk of material to be handled and the relatively greater amount of the diluent material to be recovered.

As diluent materials for use in accordance with the invention, we preferably employ organic substances which exist as liquids and which are substantially inert under the conditions at which the oxidation is effected, and which act as solvents for the unsaturated aldehydes and the corresponding unsaturated acids. A wide variety of liquid organic solvents possessing the requisite resistance against oxidation and other reactions under conditions at which the aldehyde is oxidized in said solvent phase are suitable for use in the execution of our invention. The diluent material is preferably selected with respect to the boiling temperature of the unsaturated aldehyde, the resulting unsaturated acid, and the ester, if the unsaturated acid is esterified in the solvent phase, so that said solvent may be separated from the unreacted aldehyde and/or the products of reaction by distillation means. In many cases, particularly when it is desired to esterify the unsaturated acid in the solvent phase subsequent to its formation therein, a solvent which is capable of forming a constant boiling mixture with water is selected. The selected solvent may form an azeotrope with water or the principle of additive vapor pressures may be relied upon.

Preferably employed diluent materials include among others the aromatic and aralkyl hydrocarbons as benzene, toluene, xylene, ethyl benzene, propyl benzene, cymene and the like; the alicyclic hydrocarbons as cyclohexane, tetrahydro-benzene, methyl cyclohexane, ethyl cyclopentane and the like; the paraffin hydrocarbons and mixtures thereof possessing the desired boiling temperature or range, particularly those boiling at temperatures greater than about 40° C. as the hexanes, heptanes, octanes, nonanes, etc.; the olefines possessed of the desired boiling temperature and resistance against oxidation and their polymers and suitable addition products as the dibutylenes, the diamylenes, the higher olefine halides, oxides and the like. A conveniently employed and particularly suitable group of substantially inert solvents are the aromatic as well as aliphatic halides as carbon tetrachloride, ethylene dichloride, ethylene trichloride, propylene dichloride, the butyl chlorides, the butenyl chlorides as isocrotyl chloride and isobutenyl chloride, the amyl chlorides, the pentenyl chlorides, phenyl chloride, benzyl chloride and the like and their homologues, analogues and suitable substitution products. Petroleum hydrocarbon fractions as petroleum ether, gasoline, kerosene and the like are suitable for use in the execution of the invention.

A suitable group of conveniently employed diluent materials includes the saturated as well as unsaturated alcohols and the saturated as well as the sufficiently stable unsaturated carboxylic acids. The alcohols are conveniently employed when it is desired to esterify the unsaturated acid subsequent to its production. An alcohol corresponding to the ester desired may be used as the solvent for the unsaturated aldehyde to be oxidized. Suitable alcohols for this purpose are hereinafter described. Suitable carboxylic acids which may be used as diluent materials are the acids as formic, acetic, propionic, normol- or isobutyric, normal or isovaleric, methyl ethyl acetic and the like.

The oxidation may be effected in the presence of or in the absence of catalysts. Due to the rapid rate of reaction, even at low temperatures, catalysts are in many cases unnecessary. In some cases, peroxides are formed in the course of the oxidation. Since peroxides are in many cases polymerization promoters, their presence is preferably precluded by employing a catalyst which may or may not accelerate the oxidation but which preferably acts as a peroxide-destroying catalyst or acts to inhibit the formation of peroxides. Catalysts of the oxygen-carrier type are preferably avoided since they are in many cases too powerful and oxidize the aldehydes to carbon monoxide, carbon dioxide, ketones, etc. Suitable catalysts in the process are the salts and/or oxides of elements of the eighth group of the Periodic Table as well as the salts of the rare earth metals, also said elements themselves. Platinum black and the salts of iron, cerium, nickel and cobalt, particularly the carboxylic acid salts, are suitable catalysts. Vanadium pentoxide is another example of a catalyst which not only accelerates the desired reaction but destroys peroxides and inhibits their formation. The most useful concentration of catalyst to employ will be dependent upon the activity of the catalyst, upon its degree of subdivision, the extent to which the aldehyde is diluted and upon the particular aldehyde oxidized.

One or a plurality of catalytic agents may be employed. A selected catalyst or catalysts may be applied in a variety of manners in any suitable form as powder, granules, pellets, etc. Some of the salts of the base metals are wholly or partly soluble in the reaction mixture. In general, the use of metal halide catalysts is undesirable, since they many times inhibit the rate of reaction.

The oxygen or oxygen-containing gas may be applied at substantially atmospheric or at superatmospheric pressure. In many cases, for the purpose of maintaining a desirable rate of reaction at moderate temperatures, it is desirable to employ partial pressures of oxygen greater than about $\frac{1}{5}$ of one atmosphere. We may employ oxygen per se or oxygen-containing gases as air and the like. Gases containing more oxygen than air such as substantially pure oxygen or gases containing about 22% to about 80% oxygen or greater, or gases containing less than about 20% oxygen may be used. Suitable oxygen-containing mixtures other than air may be obtained as by-products in the production of nitrogen for ammonia manufacture, etc.

The oxidation is effected at a temperature sufficiently high to permit reaction at a practical rate but sufficiently low to avoid the excessive occurrence of undesirable side reactions. Generally, temperatures not substantially above 50° C. are suitable. Higher temperatures may in some cases be used if care is taken to avoid destructive oxidation. We preferably operate in the temperature range of from about 25° C. to about 50° C.

The oxygen or oxygen-containing gas is brought into intimate contact with the mixture of the unsaturated aldehyde and the inert solvent. The oxygen or oxygen-containing gas may be introduced by means of a tube, jet, or other dispersing means into the liquid mixture, which mixture is preferably agitated by some suitable means as shaking, mechanical stirring and the like. The oxidation reaction is exothermic. Cooling means may, when necessary, be employed to maintain the reaction mixture at the desired temperature. In addition, the temperature may be controlled by regulating the dilution of the reactants and/or, for example, by regulating the rate of admittance of the oxygen or oxygen-containing gas.

As the mixture containing the unsaturated aldehyde is treated, the corresponding unsaturated acid is formed, which acid is preferably soluble in the reaction mixture. The process may be continued until substantially all of the unsaturated aldehyde present has been oxidized. The reaction, however, need not be carried substantially to completion but may be stopped whenever the required amount of aldehyde has been oxidized.

The rate of oxygen absorption by the reaction mixture is highest when the aldehyde therein is concentrated. The rate of absorption gradually decreases with decreasing aldehyde concentration. The operation is usually terminated when the concentration of unsaturated aldehyde becomes so low that an unreasonably long reaction time would be necessary to effect completion of the reaction.

The oxidation is preferably effected in the substantial absence of water. When the aqueous content of the reaction mixture is low, we have found that the reaction proceeds faster and that better yields of the unsaturated acid may be obtained. The presence of small amounts of water is not fatal to the reaction, in fact, we may operate successfully when the reaction mixture contains as much as about 5% water; however, in the presence of excessive amounts of water, the rate may be so low as to render the process impractical. If the oxygen or oxygen-containing gas contains prohibitive amounts of water, the same may be substantially dried by contact with dehydrating agents as calcium chloride, lime, sodium sulphate, potassium carbonate, etc., prior to its introduction into the reaction mixture. The diluent for the aldehyde or aldehydes, as well as the aldehyde or mixture of aldehydes may, if they contain prohibitive amounts of water, be substantially freed of water by any of the known methods as distillation, use of drying agents, etc., severally or the mixture may be treated. A convenient way of rendering the reaction mixture substantially anhydrous when the aldehyde to be oxidized contains water comprises adding the aldehyde in the required amount to an excess of a suitable inert solvent as herein described and heating the mixture to remove the water as a constant boiling mixture with the excess of the inert solvent and/or the unsaturated aldehyde. If the unsaturated aldehyde boils at a lower temperature than the solvent employed or the azeotrope of the solvent with water, the water may be distilled from the mixture as an azeotrope with the unsaturated aldehyde.

We may oxidize the unsaturated aldehydes separately or a mixture comprising more than one species of unsaturated aldehyde may be treated and a mixture of unsaturated carboxylic acids obtained. The source of the unsaturated aldehyde or aldehydes is immaterial. When an unsaturated aldehyde of the type herein described has been stabilized against polymerization on storage by the addition thereto of polymerization inhibitors as hydroxy-aromatic compounds, nitrogen-containing inhibitors and the like, said inhibitors are preferably removed from the unsaturated aldehyde by distillation or other suitable means prior to its oxidation. We have found that, in the majority of cases, such polymerization inhibitors also act to prevent or retard the oxidation.

The reaction product of the oxidation comprises a mixture of the substantially inert reaction medium, at least one unsaturated carboxylic acid corresponding to the unsaturated aldehyde oxidized and, in the majority of cases, a relatively smaller amount of the unreacted unsaturated aldehyde. If desired, the unsaturated aldehyde and any water that is present may be removed from the reaction mixture by distillation. If an excess of the inert solvent reaction medium is present in an amount in excess of that necessary to dilute the unsaturated acid to the extent that substantial polymerization is avoided, said excess may be removed by distillation means, preferably under subatmospheric pressures to avoid the use of high temperatures favorable to excessive polymerization. It is desirable, to avoid excessive polymerization, that the unsaturated acid be present in the mixture in a concentration not exceeding about 75%. In a more concentrated form, such unsaturated acids polymerize rapidly and substantially completely to valueless products when heated or allowed to stand for any considerable period of time. The unsaturated acids due to their tendency to polymerize on standing, even when diluted, are preferably utilized for the desired purpose substantially as soon as or shortly after they are formed.

Our invention provides a novel and valuable method for preparing the esters of the readily polymerizable unsaturated carboxylic acids obtainable by oxidizing the unsaturated aldehydes of the type herein described. Subsequent to the oxidation step, an alcohol, and if necessary or desirable an acid-acting esterification catalyst, may be added in the required amount to the reaction mixture containing the unsaturated acid and a substantially inert solvent for said acid, and the mixture heated to a temperature at which the esterification reaction occurs at a practical rate. If desired the oxidation may be effected in an alcohol medium and the mixture, subsequent to the oxidation, treated under conditions at which the unsaturated acid is esterified by reaction with the excess of the solvent alcohol. This mode of operation is advantageous in that the unsaturated aldehyde can be oxidized and the resulting unsaturated acid esterified in the same alcohol reaction medium.

In the esterification, the substantially inert solvent for the unsaturated acid may conveniently serve as a dehydration agent by removing extraneous water and water formed during the esterification as a constant boiling mixture therewith. Conditions of temperature and pressure may be so adjusted that the esterification reaction proceeds at a practical rate while water is removed from the reaction mixture substantially as soon as it is formed therein.

As solvents for the unsaturated aldehydes in the oxidation step of our process, and as reagents in the esterification of the resulting unsaturated acids, we may employ the monohydric alcohols as ethyl, propyl, isopropyl, butyl, isobutyl, secondary butyl, tertiary butyl, amyl, secondary amyl, tertiary amyl and the like and their homologues, analogues and suitable substitution products. Another suitable group of alcohols includes the polyhydric alcohols as ethylene glycol, the propylene, butylene, amylene and higher glycols, glycerol and its homologues, the polyglycols, etc. Where polyhydric alcohols are used, one or more hydroxyl groups may be taken up by ether and/or ester groups provided at least one hydroxyl group is present. In addition to saturated alcohols, unsaturated alcohols as allyl, crotyl, methyl allyl, propargyl, cinnamyl, the butenols, the pentenols, etc. as well as the terpeneols may be used. Suitable cyclic alcohols may be employed. Such cyclic alcohols include, in addition to those above listed, compounds as benzyl alcohol, the phenyl propyl alcohols, cyclohexanol, furfuryl alcohol and the like.

Suitable catalysts which may be used to accelerate the esterification reactions are the mineral acids as the hydrogen halides, the sulphuric acids, the phosphoric acids, the phosphorous acids and the like. We may also employ suitable acid-acting salts, compounds capable of liberating mineral acids under reaction conditions and organic acid-acting compounds as benzene sulphonic acid and its homologues and analogues, and the like.

The unsaturated carboxylic esters may be separated from the reaction mixture by any suitable means as distillation under atmospheric or subatmospheric pressure. If the resulting ester is insoluble in the substantially inert solvent for the unsaturated acid, stratification, filtration and the like means may be resorted to for its recovery.

We have found that it is not necessary that the reaction product comprising an unsaturated carboxylic acid dissolved in a suitable substantially inert solvent be used substantially as soon as formed to avoid excessive polymerization of the unsaturated acid. Such a solution may be preserved for a relatively long period of time against excessive polymerization by adding thereto, in the required amount, a suitable polymerization inhibiting agent.

We have found that the mono- and polyhydric phenolic compounds as phenol, the cresols, the xylenols, carvacrol, thymol, catechol, resorcinol, hydroquinone, guaiacol, orcinol, quinitol, pyrogallol, hydroxy-quinol and the like are particularly effective agents for the inhibition of the polymerization of the unsaturated carboxylic acids prepared in accordance with this invention. The polymerization inhibitors are in general effective when used in relatively small amounts. In the majority of cases, the inhibitors are effective when employed in concentrations of from about 0.02% to about 2.0% of the unstaurated acid present.

The following specific examples illustrate suitable means of executing our invention. It is to be understood that it is not our intention to limit the invention to the materials and conditions of these examples. Although the invention is illustrated with particular reference to isobutenal

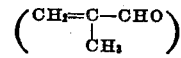

such reference is not to be construed as limitative since we are concerned with unsaturated aldehydes containing the characteristic grouping of isobutenal and its homologues, namely the structure, $$CH_2=C^{III}-CHO$$
$$|$$
$$R$$

wherein the $C^{III}$ carbon atom is linked to three other carbon atoms.

*Example I*

The oxidation was carried out in a glass reaction vessel equipped with suitable cooling means and a suitable motor-driven hollow-shaft stirrer for mixing the introduced gas with the liquid contents of the reaction vessel.

The reaction vessel, which had a capacity of about 500 cc., was charged with a solution of about 90 gms. (1.28 mols) of isobutenal

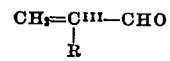

dissolved in about 100 cc. (87.8 gms.) of benzene. The initial concentration of the isobutenal in the reaction mixture was about 50.5%. The mixture was stirred while oxygen was admitted below the surface of the liquid from an aspirator bottle in communication with the reaction vessel. During the addition of the oxygen, the temperature of the reaction mixture was maintained at about 40° C. At the end of about 3 hours of continuous operation, about 9.0 liters of oxygen (measured at 0° C. and 760 mm. of Hg) or 0.4 mol of oxygen had been consumed.

The reaction mixture, at the end of this period of time, was clear and mobile indicating that substantially no polymerization of the isobutenal or the corresponding unsaturated acid had occurred. By analysis, the reaction mixture was found to contain about 56.6 gm. (0.6 mol) of the acid of the formula

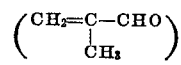

The yield of the unsaturated acid was about 75% calculated on the oxygen consumed.

The resulting reaction mixture contained, in addition to the unsaturated acid, the unreacted isobutenal and the initially applied benzene.

A portion of the reaction product was distilled under a subatmospheric pressure. When substantially all of the unchanged isobutenal and the benzene had been removed, the remaining unsaturated acid polymerized violently to form a solid white polymer.

Another portion of the reaction product was stabilized by the addition thereto of pyrogallol in an amount equal to about 0.6% of the unsaturated acid present. After standing for several days there was no indication of polymerization.

*Example II*

The oxidation was effected in substantially the same type of reaction system as described in Example I.

The reaction vessel was charged with a mixture consisting of 75.8 gm. (1.08 mols) of isobutenal dissolved in about 100 cc. (158 gm.) of carbon tetrachloride. The initial concentration of isobutenal in the reaction mixture was about 32.5%.

Oxygen was admitted below the surface of the liquid while the mixture was stirred rapidly. During the addition of the oxygen, the temperature of the reaction mixture was maintained at about 45° C. The run was terminated after about 4 hours of continuous operation. About 10.6 liters (measured at 0° C. and 780 mm. of Hg) or 0.475 mol of oxygen had been consumed.

The resulting product which consisted of a solution containing the initially applied carbon tetrachloride, unreacted isobutenal and about 56.6 gm. (0.6 mol) of the acid

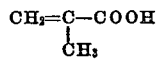

was distilled under a subatmospheric pressure for removal of the unreacted isobutenal and part of the carbon tetrachloride. The residue was stabilized against excessive polymerization by the addition thereto of hydroquinone in an amount equal to about 0.2% to 0.5% of the unsaturated acid content of the mixture.

The method of this and the foregoing example, is applicable, with variation within the scope of the invention, to the oxidation of the homologues of isobutenal as the aldehydes

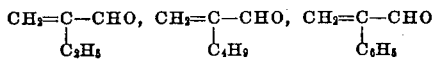

and the like, and to the stabilization of the resulting unsaturated acids or mixtures thereof.

*Example III*

A solution of about 68.8 gm. (0.8 mol) of the acid

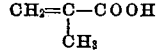

in about 100 cc. of benzene was prepared in a manner similar to that described in Example I. To this mixture, about 46 gm. (1.0 mol) of ethyl alcohol and about 0.9 gm. of sulphuric acid were added, and the mixture was heated in a dehydrating still at about the atmospheric boiling temperature of benzene. Water formed during the esterification reaction was removed from the reaction mixture as an azeotrope with benzene substantially as soon as it was formed. The operation was terminated when about 13 gm. (0.72 mol) of water had been recovered.

The sulphuric acid which had been added to accelerate the esterification reaction was neutralized by the addition of a sufficient amount of sodium hydroxide to the residue. The unreacted ethyl alcohol and the remainder of the benzene were removed by distillation under subatmospheric pressure. The residue consisted of resinous polymers of the unsaturated ester of the formula

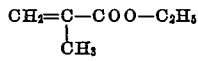

which polymers are useful as resins and as raw material in resin production.

It will be seen that our process is adaptable to batch, intermittent or continuous modes of operation. In a continuous mode of operation a suitable mixture of the unsaturated aldehyde or aldehydes and a suitable substantially inert solvent for said aldehyde or aldehydes may be continuously fed into a suitable reaction stage wherein oxidation to the desired extent may be effected and a part of the reaction mixture continuously or intermittently conducted to a communicating stage wherein esterification of the resulting unsaturated acid is effected. If desired, the esterification stage may be in communication with one or a plurality of stages wherein separation of the solvent, the unreacted alcohol and the unsaturated ester and/or its polymers is effected. Any unreacted reagents and the inert solvent recovered at any stage of the process may be conducted to the appropriate reaction state for reutilization therein.

In accordance with the process of the present invention we obtain as novel compositions of matter, valuable and useful compositions comprising a solution of a readily polymerizable unsaturated acid of the formula

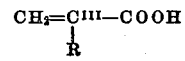

wherein the $C^{III}$ carbon atom is linked to three other carbon atoms and R represents an organic radical. Such compositions are relatively stable against excessive polymerization for considerable periods of time. If it is desired to stabilize the unsaturated acids against excessive polymerization for indefinitely prolonged periods of time, for example, if it is desired to store such acids prior to their use per se or in the manufacture of useful products therefrom, or if it is desired to transport said acids and substantially obviate polymerization losses during storage or transportation, said acids dissolved in a substantial quantity of a relatively inert organic liquid may be further stabilized by the addition thereto of a small proportion, usually from about 0.02% to about 2%, of a polymerization inhibitor of the class consisting of mono- and polyhydric phenolic compounds. Such stable compositions of matter are novel.

The unsaturated acids and their mixtures with substantially inert organic liquids prepared in accordance with the process of the present invention, as well as the unsaturated esters of such acids are valuable raw materials in the production of a wide variety of resins, resinous materials, coating compositions and the like.

While we have described our invention in a detailed manner and provided specific examples illustrating suitable modes of executing the same, it is to be understood that modifications may be made and that no limitations other than those imposed by the scope of the appended claims are intended.

We claim as our invention:

1. A composition of matter comprising the unsaturated acid of the formula

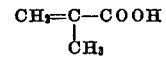

a substantial quantity of a liquid organic solvent for said acid, and a small proportion of a phenolic compound.

2. A composition of matter comprising the unsaturated acid of the formula

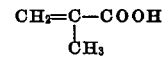

and benzene as a liquid organic solvent for said acid.

3. A process for the oxidation of an unsaturated aldehyde of the general formula

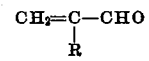

wherein R is a hydrocarbon radical, to the corresponding unsaturated carboxylic acid which comprises dissolving the unsaturated aldehyde in a liquid organic solvent which is substantially stable under oxidizing conditions, adding a peroxide-destroying oxidation catalyst to the solution, and passing a gaseous mixture containing molecular oxygen through the solution at a temperature of from about 25° C. to about 50° C. until a substantial part of the unsaturated aldehyde-content of the solution is oxidized to the corresponding unsaturated carboxylic acid.

4. A process for the oxidation of an unsaturated aldehyde of the general formula $$CH_2=C-CHO$$
$$|$$
$$R$$

wherein R is an organic radical of the class consisting of hydrocarbon radicals, halogenated hydrocarbon radicals, hydroxylated hydrocarbon radicals, carboxylated hydrocarbon radicals and the carboxyl radical, to the corresponding unsaturated carboxylic acid which comprises dissolving the unsaturated aldehyde in a non-aqueous liquid solvent therefor which is substantially stable under oxidizing conditions, adding a peroxide-destroying oxidation catalyst to the solution, and subjecting the resulting solution to the action of gaseous molecular oxygen at a temperature not substantially greater than 50° C. until a substantial part of the unsaturated aldehyde-content of the solution is oxidized to the corresponding unsaturated carboxylic acid.

5. A process for the oxidation of isobutenal to the corresponding unsaturated carboxylic acid of the formula $$CH_2=C-COOH$$
$$|$$
$$CH_3$$

which comprises dissolving the isobutenal in a liquid organic solvent which is substantially stable under oxidation conditions, adding a peroxide-destroying oxidation catalyst to the solution, and passing a gaseous mixture containing molecular oxygen through the solution until a substantial part of the isobutenal-content of the solution is oxidized to the corresponding unsaturated carboxylic acid.

HERBERT P. A. GROLL.
GEORGE HEARNE.